United States Patent [19]
Frost

[11] 3,884,404
[45] May 20, 1975

[54] VEHICLE FOR CARRIER AND LOADING DEVICE

[76] Inventor: Granger H. Frost, Box 892, Nantucket, Mass. 02554

[22] Filed: Mar. 15, 1974

[21] Appl. No.: 451,596

[52] U.S. Cl.......... 224/42.1 B; 214/84; 224/42.1 H; 248/361 A; 280/DIG. 7
[51] Int. Cl. ............................................. B60r 9/04
[58] Field of Search ........ 224/29 R, 42.1 B, 42.1 H, 224/42.1 F, 42.1 R, 42.39, 42.42 R; 214/84; 280/179 A, DIG. 7; 248/350, 361 A

[56] References Cited
UNITED STATES PATENTS

| | | | |
|---|---|---|---|
| 2,541,928 | 2/1951 | Loomis | 280/DIG. 7 |
| 3,225,475 | 12/1965 | Shank | 224/42.1 R X |
| 3,737,083 | 6/1973 | Lund | 224/42.1 H |
| R24,272 | 2/1957 | Albee | 280/DIG. 7 |

Primary Examiner—Robert J. Spar
Assistant Examiner—Leslie J. Paperner
Attorney, Agent, or Firm—Watson, Cole, Grindle & Watson

[57] ABSTRACT

A device for loading and carrying an article on a vehicle top, includes an elongated, elastic, flowable material-containing roller surrounded by a flexible net attached to a hook member secured to each end of the roller for engagement with the rain gutters of the vehicle. Tie-down lines attached to the hooks extend over the article supported by the roller and engage with a portion of the net. The roller is stretched lengthwise to effect a tight engagement between the hooks and the rain gutters. By such an arrangement, any rolling movement of the roller effects an increase in tension of the tie-down lines as they tend to roll up on the roller to thereby secure the article more tightly in place. Engagement between the hooks and gutters is likewise further tightened as the roller and net are stretched in the direction of such movement.

5 Claims, 6 Drawing Figures

VEHICLE FOR CARRIER AND LOADING DEVICE

This invention relates generally to a device which facilitates loading of an article onto a vehicle top, and permits such article to be effectively carried thereby. More particularly, the device comprises a roller cushion securely held in place on the vehicle top, and supporting the article which is likewise thereby maintained securely in place.

Heavy and bulky loads transported by a motor vehicle are oftentimes tied down to the vehicle top by means of straps or other tie-down lines, the load either resting directly on the top, or on a pad or carrier device. Depending on the size and weight of such load, it becomes increasingly difficult to load and unload the article to be carried and, at the same time, extreme care must be taken in properly securing the load in place. The straps may loosen and the load may shift or break away in transport as, for example, during sudden vehicle stops or air current movement beneath the load, thus creating a potential road hazard. Roof carriers have been heretofore devised with fixed rollers to facilitate the loading and unloading operations. However, the tie-down lines still have a tendency to loosen, and the weight and size of the carrier itself makes it impractical to store when not in use or to assemble before using. Also, securing such a costly and unwieldly carrier in place is time-consuming in itself. It is therefore an object of the present invention to provide a device to facilitate easy loading and unloading of an article to be carried on a vehicle top, such device being easy to operate, easy to manufacture, economical and highly effective in maintaining itself as well as the load to be carried securely in place on the vehicle top.

Another object is to provide such a device as comprising an elongated roller of elastic material filled with a flowable material and surrounded by a net secured to gutter hooks provided at opposite ends of the roller. The device is stretched lengthwise before hooking it in place onto the vehicle rain gutters, and tie-down lines on the gutter hooks engage with portions of the net for holding down the article to be carried. The elasticity of the stretched roller maintains it resiliantly hooked in place, and any rolling movement of the roller causes an increase in tension of the tie-down lines as they roll up on the roller thus securing the article more tightly. The hooked engagement of the roller with the gutters is further tightened as the roller and net are stretched in the direction of such movement.

Another object is to provide such device wherein swivel hooks or swivel clamp assemblies are used to more easily facilitate hooking the roller in place.

Other objects, advantages and novel features of the invention will become apparent from the following detailed description of the invention when considered in conjunction with the accompanying drawings wherein.

Figure 1:
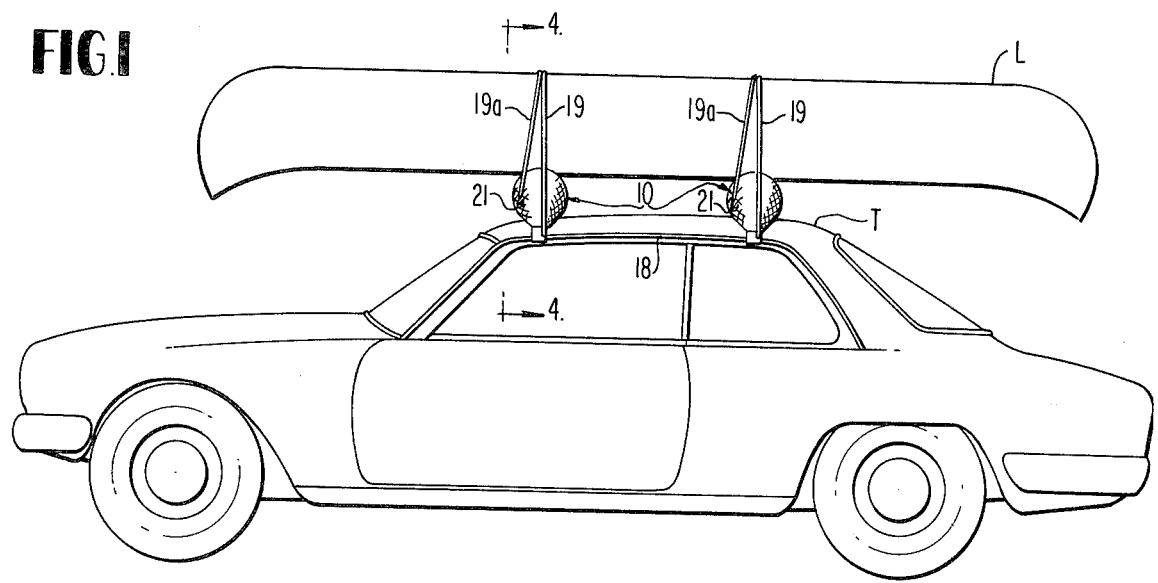
FIG. 1 is a side view of two loading and carrying devices of the invention supporting an article carried on the top of a motor vehicle.
Figures 2, 3:
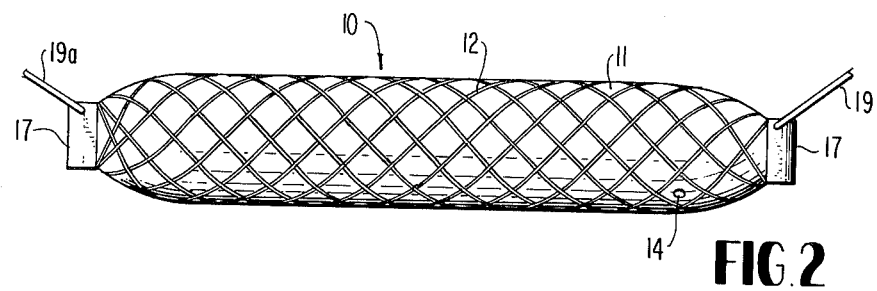
FIG. 2 is a top plan view of the roller-net assembly of the invention.
FIG. 3 is a side elevational view of the assembly of FIG. 2.

Turning now to the drawings wherein like reference characters refer to like and corresponding parts throughout the several views, the article loading and carrying device of the invention is generally designated 10 and is shown in FIG. 1 as mounted in place on a top T of a motor vehicle for supporting a load L such as a canoe. As shown in FIGS. 2, 3 and 5, the device comprises an elongated cylindrical roller 11 having closed ends and being made of an elastic material such as natural or synthetic rubber, or a stretchy fluid-impervious fabric material. The roller is surrounded by a flexible net 12 of fabric or the like in intimate contact with the outer surface of the roller. The net is an open mesh and is secured to opposite ends of the roller as in the manner shown at 13 in FIG. 5. The roller which constitutes a bladder is filled with a flowable material such as air or a liquid through a valve 14 suitably provided on some portion of the bladder as shown in FIGS. 2 to 5. Such a valve may be in the form of a known one-way air pressure valve, or it may be an open short flexible tube 15 shown in FIG. 5 serving as a nozzle for the introduction of air or a liquid into the bladder. Such a tube may be normally closed by means of a cap such as 16.

The device further includes hook members 17 secured to opposite ends of the roller in some manner as by heat-sealing or with the use of an adhesive. The hooks are designed to engage with the undersides of rain gutters 18 of the vehicle, shown in FIGS. 1 and 4 and to be more fully described hereinafter. Also, tie-down lines 19 and 19a are secured to hook members 17, and are each provided with a small hook or clip 21 at the free end thereof for engagement with a cord of the net after each line has been crossed over the article to be supported as in the manner shown in FIGS. 1 and 4.

In FIG. 5, another type hook member is shown for securing the roller in place on the car top. Here, a bracket 22 is mounted for turning movement about its axis within a built-up portion 23 provided at each end of the roller. A C-shaped clamp 24 engages both the bracket and gutter 18 for mounting the roller onto the car top similarly as in FIG. 4. Tie-down line 19 is secured to clamp 24 as shown in FIG. 5.

Figure 6:
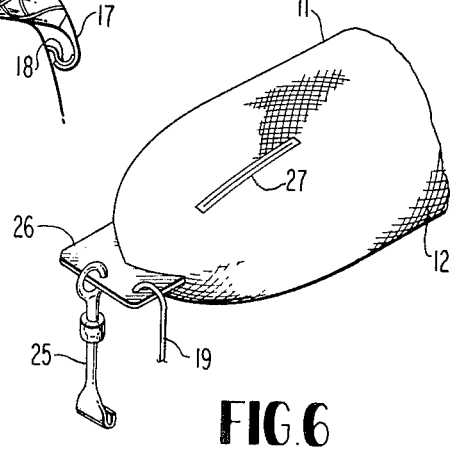
FIG. 6 is a partial view of the roller-net assembly showing yet another embodiment of a hook assembly secured thereto.

In FIG. 6, still another type clamp is shown as at 25 mounted on a plate bracket 26 secured to opposite ends of the roller. Clamp 25 is a standard swivel clamp allowing its jaw portion to be turned about the clamp axis. A tie-down line 19 is also attached to plate bracket 26 at each end of the roller. And, a zipper-type opening 27 is provided on the bladder for filling the roller with a particulate material such as gravel or small pellets of synthetic resinous material.

In operation, the roller is first filled with a liquid or inflated with a gaseous material such as air, or is alternatively filled with sand, foam rubber, foam synthetic resin, pellets of synthetic resin, or the like. The roller is so inflated or filled to only such a capacity as to permit the roller to be stretched lengthwise to some degree. The inflated or filled roller is then placed on the car top near one end and the load, such as L to be carried, is placed at one end thereof on the roller and is rolled toward the other end of the car top. One or more of such rollers may then be placed on the car top on one or both sides of the first roller.

Figure 4:
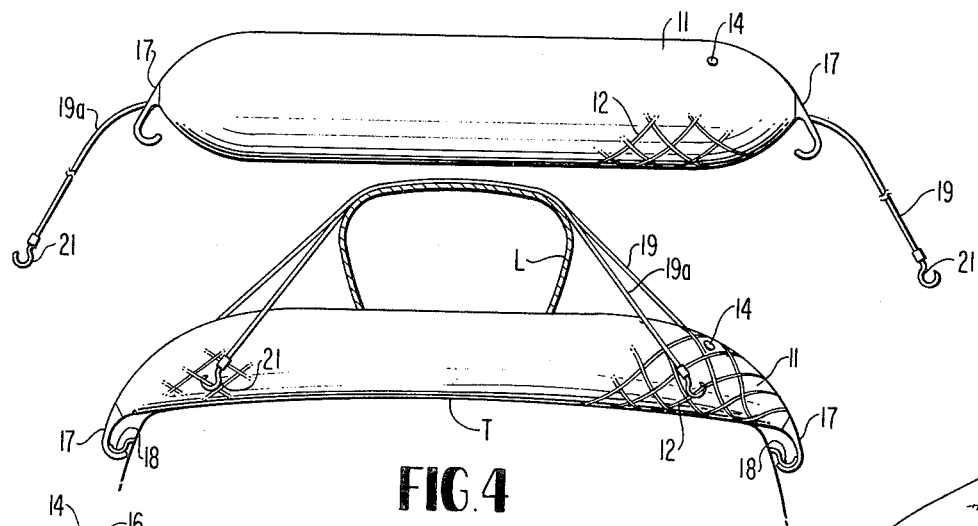
FIG. 4 is a view similar to FIG. 3 showing the roller-net assembly stretched into place on the top of the vehicle with the article to be carried tied down thereon.
Figure 5:
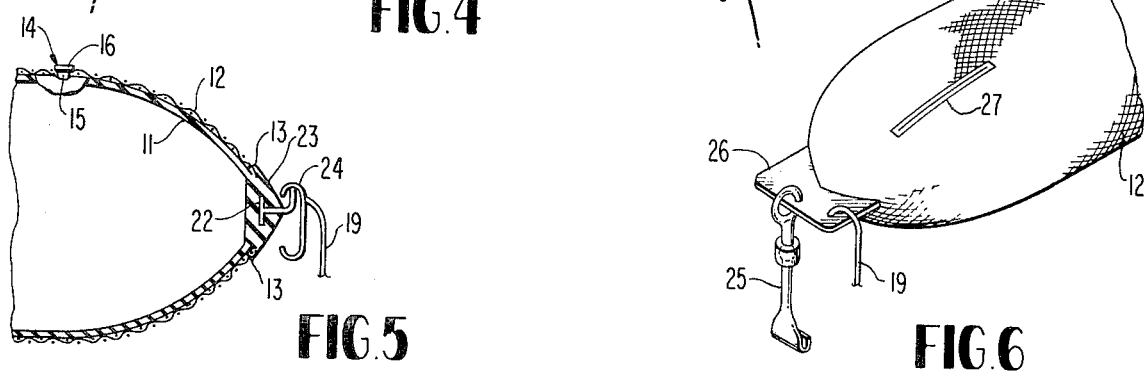
FIG. 5 is a partial view of the roller-net assembly showing its details and another embodiment of a hook secured to the ends thereof.

After the load and rollers are in place on the car top, the roller or rollers are stretched lengthwise so that their hook members may be engaged with gutters 18 of the vehicle as in the manner shown in FIG. 4. Such stretching of the rollers serves to compress the material contained therein. Of course, the spacing between hooks 17 in the relaxed condition of the roller of FIG. 2 is less than the spacing between gutters 18 so as to require the hook members to be moved away from one another before engagement with the rain gutters. Because of the elasticity of each roller 11 and the tensile forces produced upon stretching, the hooks are tightly engaged with the gutters and the filler material assumes the shape of the roller in its stretched condition.

Tie-down lines 19 and 19a for each roller are then extended over load L, after which their hooks or clips 21 engage with a cord of the net material as in FIG. 4.

In tying down the load to the rollers, it should be pointed out that both lines 19 and 19a on each roller should engage with a cord of the net on a forward portion of the roller, as shown in FIG. 4, to most effectively impede forward motion of the roller (likewise for reverse). In such manner, the tension in line 19 and 19a will be increased as they begin to slightly roll up on rollers 11 which tend to roll forwardly as during an abrupt stop of the vehicle. Accordingly, load L is pressed more firmly against the rollers thus being held even more tightly in place. And, because the rollers and their nets are stretched in the direction of such movement, each elastic bladder causes its hooks to press more tightly into engagement with the rein gutters to thereby hold the rollers even more firmly in place.

The device of the present invention can be used for a wide variety of sizes and weights of loads to be transported. The elastic roller is light, foldable, easily stored, and easily adjustable to varying gutter widths. Any number of such rollers may be used depending on the size and weight of the load to be carried. The tie-down lines running from the gutter hooks across the load to the net will tighten down on the load and the gutter hooks with the inertia of abrupt stops of the vehicle. The device acts as a cushion for the load and avoids damage to both the car top and the load during transport. No tools are needed since the roller may be inflated manually with air or filled manually with water or gravel, and the rollers may be used to transport a load over the ground or floated along the water surface.

Obviously, many modifications and variations of the present invention are possible in the light of the above teachings. It is therefore to be understood that within the scope of the appended claims the invention may be practiced otherwise than as specifically described.

What is claimed is:

1. A device for loading and carrying an article on a vehicle having rain gutters along opposite sides thereof, comprising: at least one elongated, hollow, elastic roller filled with a flowable material; a flexible net contactingly surrounding said roller; a hook member secured to opposite ends of said roller for engagement with the rain gutters; said net being attached to said hook members; tie-down lines secured to said hook members and being engaged with a portion of said net as said lines extend over the article supported on said roller; the spacing between the gutters being greater than the spacing between said hook members thereby effecting a tight engagement of the gutters by said hook members as said roller is stretched lengthwise into place; and wherein any rolling movement of said roller effects an increase in tension of said lines as they roll up on said roller to thereby secure the article more tightly in place, and to further tighten the engagement of the gutters and hooks as said roller and net are stretched in the direction of such movement.

2. The device according to claim 1 wherein each said hook member comprises a clamp engaged with a bracket rotatably secured to said roller end.

3. The device according to claim 1 wherein each said hook member comprises a swivel clamp.

4. The device according to claim 1 wherein said flowable material comprises a fluid.

5. The device according to claim 1 wherein said flowable material is granular.

* * * * *